UNITED STATES PATENT OFFICE.

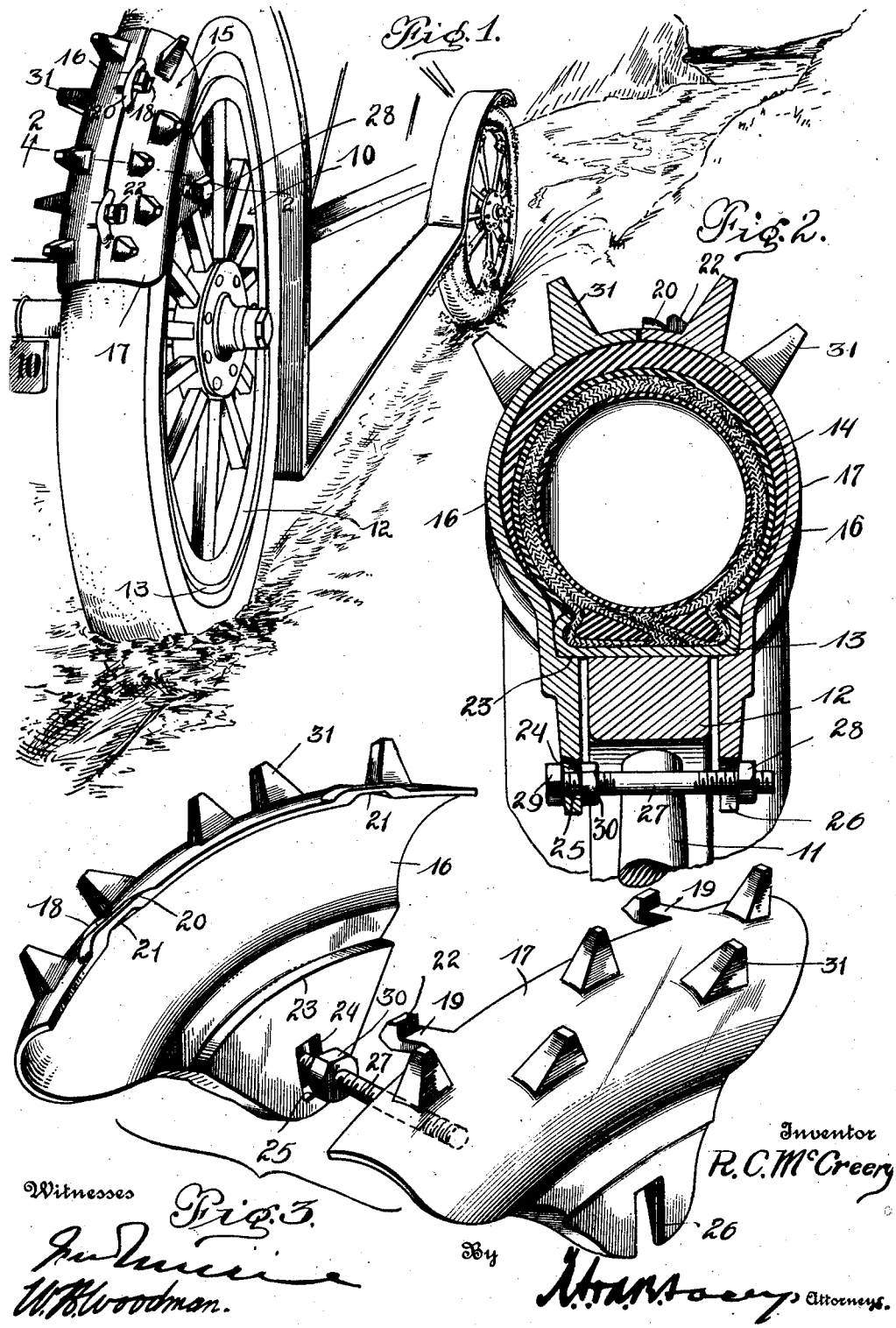

ROBERT C. McCREERY, OF ERICK, OKLAHOMA.

DETACHABLE EMERGENCY TRACTION-SHOE FOR AUTOMOBILES.

1,114,164. Specification of Letters Patent. Patented Oct. 20, 1914.

Application filed November 15, 1913. Serial No. 801,230.

*To all whom it may concern:*

Be it known that I, ROBERT C. MCCREERY, citizen of the United States, residing at Erick, in the county of Beckham and State of Oklahoma, have invented certain new and useful Improvements in Detachable Emergency Traction-Shoes for Automobiles, of which the following is a specification.

The present invention relates to new and useful improvements in detachable, emergency traction shoes for automobile and other vehicle tires, the object of my invention being to provide a traction shoe which may be readily applied to or removed from a vehicle wheel without the necessity of leaving the vehicle.

Self-propelled vehicles oftentimes become stalled, due to sinking of one or the other of the rear or propelling wheels of the vehicle into deep mud or sand as under such circumstances the wheel or wheels so partially buried in the mud or sand do not possess sufficient tractive force to free themselfes therefrom, the wheels spinning without advancing. This is partially due to the fact that a wheel so buried, in order to roll to advance the vehicle, must, in effect, roll up an incline in getting out of the mud or sand onto the surrounding level. Under these circumstances, the poor tractive engagement of the ordinary tire with the slippery surface of the mud or sand is insufficient to force the wheel over even the smallest incline. Under such circumstances, it is now customary to either jack the wheel up out of the mud-hole or to otherwise lift the car clear of the trouble. At times, when so stalled, the driver of the car is forced to wind the wheel with rope or to attach traction devices to the wheel or tire. To the best of my knowledge such traction devices necessitate the dismounting, from the car, of the person applying them which is a serious disadvantage as the road is usually muddy or sandy at places where it is necessary to employ such devices.

My invention consists of a two-part traction shoe which may be conveniently applied to one or more of the wheels of the vehicle without dismounting from the car and which may be as readily removed after the vehicle has been extricated from the mud-hole or sand.

In this connection, a further object of my invention is to construct the traction shoe in two-parts hingedly connected in such a manner that it may be employed upon vehicle wheels differing somewhat in size and having tires of varying diameters.

A further object of my invention is to so hinge the members of the shoe together that the hinges themselves serve as additional traction lugs for increasing the tractive effect of the shoe as a whole.

A still further object of my invention is to so construct the body members of the traction shoe that they will lockingly engage the rim of the wheel to which they are applied to prevent all rocking movement or all longitudinal creeping of the shoe about the tire.

A still further object of my invention is to provide means for securely attaching the traction shoe in place by the use of a single bolt and nut so arranged that the bolt, during application or removal of the shoe, need not be passed through any small bolt receiving hole, but merely swung into a slot. And a still further object of my invention is to so mount the bolt upon one of the body members that while it is free for swinging movement its swinging movement will be restricted and any total disengagement of the bolt from the member upon which it is swingingly mounted prevented.

With these and other objects in view, my invention will be more fully described, illustrated in the accompanying drawing, and then specifically pointed out in the claims which are attached to and form a part of this application.

In the drawing: Figure 1 is a fragmentary perspective view, showing my improved traction shoe applied to a conventional form of self-propelled vehicle wheel; Fig. 2 is a transverse sectional view taken on the line 2—2 of Fig. 1, showing more clearly the manner in which the shoe is fitted about the tire and rim of the wheel; Fig. 3 is a perspective view of the shoe removed from the wheel, the parts of the shoe in this figure being shown in unassembled position.

Corresponding and like parts are referred to in the following description and indicated in all the views of the drawing by the same reference characters.

In order to insure a clear and complete understanding of my invention and its use I have illustrated my traction shoe in connection with a conventional form of vehicle wheel 10 of the type commonly used upon self-propelled vehicles, this wheel including spokes 11, a felly 12 and a clencher rim 13, the peripheral edges of which extend beyond the sides of the felly, as best shown in Fig 2. A pneumatic tire 14 is mounted about the rim 13 and my traction shoe, indicated as a whole by the numeral 15, is adapted for detachable application about a portion of this tire and rim.

This traction shoe consists broadly of two symmetrically formed body members 16 and 17, each preferably cast in a single piece from malleable iron or other suitable metal. Each of these members is curved longitudinally to conform substantially to the peripheral curvature of the wheel upon which the device is to be used and each is curved transversely to conform to the transverse curvature of the type of tire employed upon such wheel. As best shown in Fig. 3 of the drawing, these body members are each substantially triangular in shape and to secure the best results should not cover over one-fifth of the tire tread when in place, but one of the traction devices being employed upon a wheel.

That edge of the body member 16 which abuts against the corresponding edge of the body member 17, when the device is in place upon the wheel, is provided adjacent each end with a squared opening or slot 18 adapted to receive one of the pintle lugs 19 correspondingly formed upon the adjacent edge of the section or body member 17. The edge portion of the body member 16, adjacent each of these slots 18, is thickened as shown at 20 and provided with undercut grooves or channels 21 communicating with the slots 18, the result being that the edge portion of the body member adjacent the openings 18 are raised somewhat to receive the shank portions of the pintle lugs 19 so that they will not cause injury to the tire when the traction shoe is in place. Each of the traction lugs includes a body portion or shank terminating at its free end in an upwardly directed extension or head 22 which projects through the corresponding opening or slot 18 when the shoe is assembled. Both the upper and lower faces of this head are beveled or inclined as shown to permit pivotal movement of the pintle lug in its opening or slot, this beveling being clearly shown in Fig. 3 of the drawing.

It will be clearly apparent that the traction shoe formed in two parts hingedly joined by slot and pintle lug connections in the manner described, is capable of adjustment for use upon tires of varying diameters as the free edges or ends of the shoe sections may be readily swung toward and away from each other. The pintle lugs are preferably formed with heads of sufficient size to serve as traction lugs for the shoe as additional tractive force is obtained by this construction and a more certain connection of the parts also insured.

As previously described, the shoe members are curved transversely in conformance with the transverse curvature of the tire in order to engage snugly about the tire when the traction shoe is in place. These body members are so proportioned that their inner or narrower ends extend beyond the rim and felly of the wheel and said end portions are directed inwardly to bear snugly against the outer faces of the rim 13, after which they are extended in such a manner as to lie in substantially parallel relation to each other when the shoe is in place. Each of the body members is provided interiorly with an inwardly directed arcuate shoulder 23 for engagement beneath the projecting peripheral edge portions of the clencher rim 13 when the traction shoe is in place, the engagement of these shoulders with the clencher rim being clearly shown in Fig. 2 of the drawings.

The free or inner end of one of the body members, preferably that body member having the slots 18, is provided with a squared slot or opening 24, the upper and lower faces of which are inclined inwardly and downwardly as shown at 25 in Fig. 2 of the drawing. The corresponding end of the opposite body member is provided with a slot 26 which opens through the inner edge of said member. In order to firmly fasten the traction shoe in place upon the tire, a bolt 27 and nut 28 are employed. This bolt is passed through the squared slot 24 until its head 29 engages the outer face of the shoe member 16 and when the shoe has been applied, may be swung to seat its free end in the slot 26 of the opposite shoe member. The nut 28 is then threaded upon the bolt and turned home to draw the inner ends of the shoe members toward each other and bring their shoulders 23 into firm locking engagement beneath the rim of the wheel. This drawing together of the inner ends of the shoe members also serves to draw the pintle lugs into close engagement with the edge portions of the body member 16 adjacent the slots 18. The shoe members are therefore firmly held against any movement independent of each other and also against any movement with respect to the wheel tire to which they are applied. In order to prevent casual disengagement of the bolt 27 from the shoe member 16 which carries it, the bolt shank adjacent its head is preferably threaded to receive a guard nut 30, this nut, in use, being spaced a sufficient distance from the head 29 of the bolt to permit the bolt to swing freely in the squared opening or slot 24. The inclined upper and lower edges 25 of this slot permit free inward swinging of the free end of the bolt, but at the same time limit such swinging, for a reason which will be hereinafter explained.

Both shoe members are provided with a plurality of traction lugs 31, each of which extends radially from the body member by which it is carried, these traction lugs being preferably formed upon the body members in such a manner that the lugs of one are symmetrically disposed with respect to the lugs of the other, although the lugs of each row are disposed in staggered relation with respect to the lugs of another row upon the same section. These lugs may be either cast integrally with the body members of the shoe or separately formed and later secured to the shoe in any suitable manner. Although I preferably cast the shoe members from malleable iron, it will of course be understood that any other suitable metal may be employed or that the shoe members may be stamped or otherwise formed from sheet steel of sufficient weight. In this latter construction, the lugs will, of course, be separately formed and riveted or otherwise secured in place.

It will be clear that no straps or other fastening devices of like nature, which are liable to become rotted through use or broken through excessive strain, are employed with this device.

The operation, or rather the application of my improved traction shoe, will be clearly understood from the above description, taken in connection with the drawing. When it becomes necessary to apply the traction shoe, the driver may position the same by standing upon the running-board of the vehicle, or with some vehicles, by merely leaning from the seat. In applying the shoe that shoe member having the hinge slots or openings 18, is first positioned upon the tire with its inner end bearing against the inner side of the tire, the shoe, of course, for the sake of convenience, being applied to that portion of the wheel which is uppermost. The other shoe section is then moved to place and its lower end tilted outwardly somewhat to permit the passage of its pintle lugs through the channels 21 communicating with the openings 18 to hingedly connect the two sections together. The driver then reaches between adjacent spokes of the wheel to grasp the bolt 27 and swing its free end upwardly through the slot 26 when the nut 28 is turned home.

As previously mentioned, the free swinging of the bolt 27 is somewhat limited and for this reason the bolt is always within easy reach of the driver when applying the shoe. As soon as the vehicle has been extricated from the mud-hole or sand, the shoe should be removed, this being readily accomplished by merely loosening the nut 28 and lifting the shoe from place.

Although I have illustrated my improved traction shoe in all its details, it will of course be understood that I do not wish in any way to limit myself to the specific features of construction illustrated in the drawing and described in the specification or to the employment of any particular materials in its manufacture, as various minor changes, within the scope of the appended claims, may be made at any time without in the slightest degree departing from the spirit of my invention.

Having thus described the invention, what is claimed as new is:

1. A tractor shoe for vehicle wheels including hingedly connected body members adapted to encircle a tire and having ends adapted to extend inwardly beyond the rim of a wheel, one of said ends being apertured and the other slotted, a bolt passed through the apertured end and free to swing therein, a nut loosely threaded on the bolt to prevent disengagement of the bolt through the aperture, and a clamping nut threaded on the bolt to engage the outer face of the slotted end of the other body member where by the free ends of the body members may be drawn toward each other.

2. A tractor shoe for vehicle wheels including a pair of hingedly connected metallic body members shaped to conform to the peripheral contour of a tire, the free ends of said body members being adapted to extend inwardly beyond the felly of the wheel and being slotted, the slot in the end of one of said body members opening through such end, while the slot in the end of the other body member is a closed slot having its upper and lower walls similarly inclined downwardly and inwardly, a bolt passed through said latter slot and free to swing therein because of such inclination of its walls, said bolt being adapted to swing at its free end to extend in the other slot, and a clamping nut on the bolt.

In testimony whereof I affix my signature in presence of two witnesses.

ROBERT C. McCREERY. [L. S.]

Witnesses:
  SAMUEL N. ACKER,
  J. D. YOAKLEY.